United States Patent
Stevens

(10) Patent No.: US 10,439,934 B2
(45) Date of Patent: Oct. 8, 2019

(54) SYSTEMS AND METHODS FOR ADDRESSING MULTIPLE PHYSICAL AND VIRTUAL FUNCTIONS IN NETWORK CONTROLLER-SIDEBAND INTERFACE

(71) Applicant: Dell Products L.P., Round Rock, TX (US)

(72) Inventor: Robert T. Stevens, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 15/492,692

(22) Filed: Apr. 20, 2017

(65) Prior Publication Data

US 2018/0309668 A1    Oct. 25, 2018

(51) Int. Cl.
*H04L 12/741* (2013.01)
*H04L 29/06* (2006.01)
*H04B 1/30* (2006.01)

(52) U.S. Cl.
CPC .............. *H04L 45/74* (2013.01); *H04L 69/22* (2013.01); *H04B 1/302* (2013.01)

(58) Field of Classification Search
None
See application file for complete search history.

(56) References Cited

U.S. PATENT DOCUMENTS

| | | | |
|---|---|---|---|
| 9,379,977 B2 * | 6/2016 | Kutch | H04L 45/745 |
| 9,928,206 B2 * | 3/2018 | Bhatia | G06F 9/44505 |
| 9,948,558 B2 * | 4/2018 | Kutch | H04L 45/745 |
| 2010/0005190 A1 * | 1/2010 | Shah | H04L 41/00 709/235 |
| 2014/0173093 A1 * | 6/2014 | Rabeela | H04L 61/2038 709/224 |
| 2015/0334018 A1 * | 11/2015 | Kutch | H04L 45/745 370/254 |
| 2016/0127171 A1 * | 5/2016 | Kutch | H04L 67/10 709/223 |
| 2016/0156518 A1 * | 6/2016 | Zhao | G06F 11/30 709/223 |
| 2016/0248620 A1 * | 8/2016 | Itkin | H04L 41/04 |
| 2017/0085480 A1 * | 3/2017 | Kutch | H04L 45/745 |
| 2017/0150378 A1 * | 5/2017 | Dumov | H04W 24/04 |

* cited by examiner

*Primary Examiner* — Hicham B Foud
(74) *Attorney, Agent, or Firm* — Jackson Walker L.L.P.

(57) ABSTRACT

In accordance with embodiments of the present disclosure, an information handling system may include a host system and a management controller. The host system may include a host system processor and a device coupled to the host system processor. The management controller may be communicatively coupled to the host system processor and configured to provide management of the information handling system and manage multiple functions instantiated on the device via a single sideband interface channel interfaced between the device and the management controller by communicating function-oriented sideband commands, each function-oriented sideband command including a function address field for setting forth a function of the multiple functions to which the function-oriented sideband command is addressed.

18 Claims, 3 Drawing Sheets

FIG. 2

| BYTES | BITS | | | |
|---|---|---|---|---|
| | 31..24 | 23..16 | 15..08 | 07..00 |
| 00..03 | MC ID | HEADER REVISION | RESERVED | IID |
| 04..07 | CONTROL PACKET TYPE | CH. ID | RESERVED | PAYLOAD LENGTH |
| 08..11 | FUNCTION ADDRESS | | | |
| 12..15 | RESERVED | | | |

| BYTES | BITS | | | |
|---|---|---|---|---|
| | 31..24 | 23..16 | 15..08 | 07..00 |
| 00..15 | NC-SI HEADER | | | |
| 16..19 | CHECKSUM | | | |
| 20..45 | PAD | | | |

| BYTES | BITS | | | |
|---|---|---|---|---|
| | 31..24 | 23..16 | 15..08 | 07..00 |
| 00..15 | NC-SI HEADER | | | |
| 16..19 | RESPONSE CODE | | REASON CODE | |
| 20..23 | PF ASSIGNMENT BITMAP | | | |
| 24..27 | CHECKSUM | | | |
| 28..45 | PAD | | | |

| BYTES | BITS | | | |
|---|---|---|---|---|
| | 31..24 | 23..16 | 15..08 | 07..00 |
| 00..15 | NC-SI HEADER | | | |
| 16..19 | PF ASSIGNMENT BITMAP | | | |
| 24..27 | CHECKSUM | | | |
| 28..45 | PAD | | | |

| BYTES | BITS | | | |
|---|---|---|---|---|
| | 31..24 | 23..16 | 15..08 | 07..00 |
| 00..15 | NC-SI HEADER | | | |
| 16..19 | CHECKSUM | | | |
| 20..45 | PAD | | | |

FIG. 3D

SYSTEMS AND METHODS FOR ADDRESSING MULTIPLE PHYSICAL AND VIRTUAL FUNCTIONS IN NETWORK CONTROLLER-SIDEBAND INTERFACE

TECHNICAL FIELD

The present disclosure relates in general to information handling systems, and more particularly to methods and systems for enabling the addressing of multiple physical and virtual functions in network controller-sideband interface.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a management controller, such as an Integrated Dell Remote Access Controller (iDRAC), to perform out-of-band remote management tasks on various components of the information handling system. A management controller may communicate with and manage information handling system components via a sideband interface, such as a Network Controller-Sideband Interface (NC-SI). The existing standard for NC-SI, as defined by the Distributed Management Task Force (DMTF), does not account for more than one function on an NC-SI channel and is therefore unable to handle newer controllers that have implemented a plurality of physical and virtual functions on a single port.

SUMMARY

In accordance with the teachings of the present disclosure, the disadvantages and problems associated with existing approaches for addressing multiple physical and virtual functions may be reduced or eliminated.

In accordance with embodiments of the present disclosure, an information handling system may include a host system and a management controller. The host system may include a host system processor and a device coupled to the host system processor. The management controller may be communicatively coupled to the host system processor and configured to provide management of the information handling system and manage multiple functions instantiated on the device via a single sideband interface channel interfaced between the device and the management controller by communicating function-oriented sideband commands, each function-oriented sideband command including a function address field for setting forth a function of the multiple functions to which the function-oriented sideband command is addressed.

In accordance with these and other embodiments of the present disclosure, a method may include, in an information handling system comprising a host system having a host system processor and a device coupled to the host system processor, providing management of the information handling system and managing multiple functions instantiated on the device by communicating function-oriented sideband commands via a single sideband interface channel interfaced between the device and the management controller, each function-oriented sideband command including a function address field for setting forth a function of the multiple functions to which the function-oriented sideband command is addressed.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system having a host system processor and a device coupled to the host system processor: provide management of the information handling system and manage multiple functions instantiated on the device by communicating function-oriented sideband commands via a single sideband interface channel interfaced between the device and the management controller, each function-oriented sideband command including a function address field for setting forth a function of the multiple functions to which the function-oriented sideband command is addressed.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a table setting forth an example control packet header of an NC-SI command, in accordance with embodiments of the present disclosure; and FIGS. 3A-3D each illustrate a table setting forth an example control packet header of an NC-SI command or response, in accordance with embodiments of the present disclosure.

DETAILED DESCRIPTION

Figure 1:
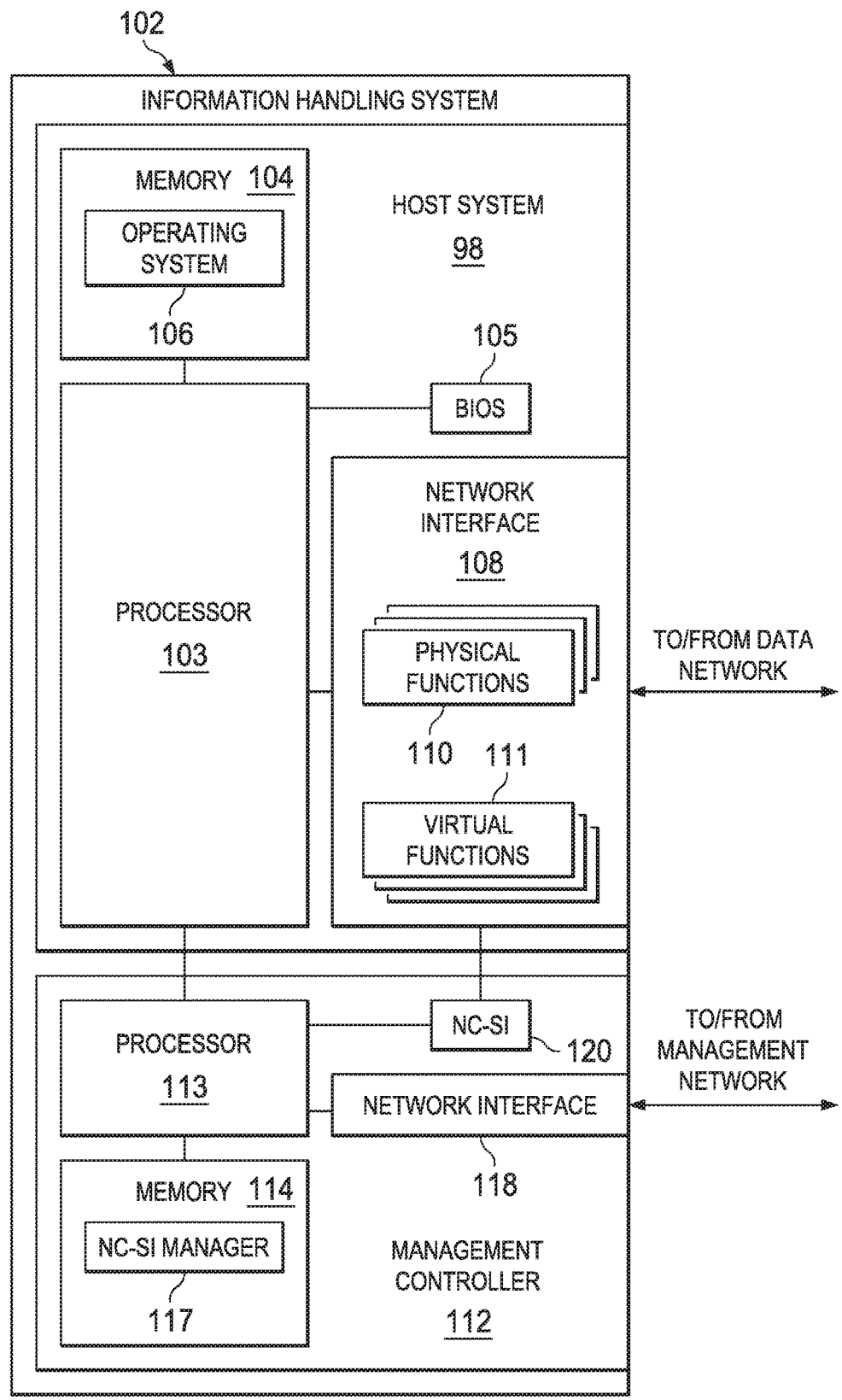
FIG. 1 illustrates a block diagram of an example information handling system, in accordance with embodiments of the present disclosure.

Preferred embodiments and their advantages are best understood by reference to FIGS. 1 through 3D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103. In operation, processor 103, memory 104, BIOS 105, and network interface 108 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

As shown in FIG. 1, a plurality of physical functions 110 and/or virtual functions 111 may execute on network interface 108. The plurality of functions may enable input/output (I/O) virtualization of network interface 108, such that network interface 108 may appear as multiple network interfaces to components of information handling system 102. As an example, a physical function 110 may include a function (e.g., a PCIe function) configured to provide full PCIe I/O virtualization of network interface 108, including provision of I/O virtualization capabilities and management of virtual functions 111.

A virtual function 111 may comprise a function (e.g., a PCIe function) which may be directly accessible to a host system 98, and may include its own isolated memory space, work queue, interrupts, and command processing for communication of data between such virtual function 111 and any resources of a host system 98 allocated to such virtual function 111.

Management controller 112 may be configured to provide management facilities for management of information handling system 102. Such management may be made by management controller 112 even if information handling system 102 is powered off or powered to a standby state. Management controller 112 may include a processor 113, memory 114, a management network interface 118 separate from and physically isolated from data network interface 108, and a Network Controller-Sideband Interface (NC-SI) 120. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon an NC-SI manager 117. NC-SI manager 117 may comprise any program of executable instructions, or aggregation of programs of executable instructions, to manage NC-SI 120. In particular, NC-SI manager 117 may be configured to communicate with a network device (e.g., network interface 108) or other device via a sideband interface (e.g., NC-SI 120) in order to manage such device. Although NC-SI manager 117 is shown in FIG. 1 as stored in memory 114, in some embodiments NC-SI manager 117 may be stored in storage media accessible to processor 113, and active portions of NC-SI manager 117 may be transferred from such storage media to memory 114 for execution by processor 113.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

NC-SI 120 may comprise an interface of management controller 112 which is separate from and physically isolated from network interface 118, and which is configured to receive data from and/or communicate data to host system network interface 108 of information handling system 102.

In addition to processor 103, memory 104, network interface 108, and management controller 112, information handling system 102 may include one or more other information handling resources.

In operation, in order to enable addressing multiple physical functions 110 and virtual functions 111 of network interface 108 via a single channel of NC-SI 120, NC-SI manager 117 may be configured to communicate with network interface 108 using an NC-SI command having a control packet header modified from that of a traditional NC-SI command. FIG. 2 illustrates a table setting forth an example control packet header 200 of an NC-SI command, in accordance with embodiments of the present disclosure. As shown in FIG. 2, control packet header 200 may include a function address field 202 residing in a portion of a control packet header 200 that would otherwise be reserved or unused in accordance with existing NC-SI standard. Function address field 202 is shown in FIG. 2 as being 32 bits in length, although in other embodiments, it may have a different length (e.g., 16 bits).

To support this modified control packet header 200, header revision field 204 of control packet header 200 may be modified from that of existing NC-SI standard to indicate the new functionality. Accordingly, under this new scheme, commands directed to functions may not be tied to a particular channel identifier (ID) as some implementations may allow functions to migrate among channels. Accordingly, function-oriented commands issued in accordance with control packet header 200 may use an addressing scheme for package commands in which a channel ID field 206 of control packet header 200 is set to 0x1F. Thus, network interface 108 may properly route commands to the appropriate function independent of what port or channel a function may be assigned to. Function-oriented commands may be identified and differentiated from other package-oriented commands by analyzing header revision field 204, control packet type field 208, and function address field 202 of control packet header 200.

FIGS. 3A-3D each illustrate a table setting forth an example control packet header of an NC-SI command or response, in accordance with embodiments of the present disclosure. Because functions may move among NC-SI channels, commands may be useful to query and/or set such assignments.

For example, FIG. 3A depicts an example architecture of an NC-SI command 300 that may be communicated from NC-SI manager 117 to network interface 108 to query which channel to which a function is assigned, while FIG. 3B depicts an example architecture of an NC-SI response 302 that network interface 108 may return in response to NC-SI command 300. As another example, FIG. 3C depicts an example architecture of an NC-SI command 304 that may be communicated from NC-SI manager 117 to network interface 108 to set a channel to which a function is assigned, while FIG. 3D depicts an example architecture of an NC-SI response 306 that network interface 108 may return in response to NC-SI command 304.

Although the foregoing discussion contemplates sideband communication between management controller 112 and network interface 108 using PCIe, it is understood that systems and methods similar to those described above may be applied to devices other than a network interface and/or device standards other than PCIe. For example, systems and methods identical and/or analogous to those described above may be used for sideband communication between management controller 112 and a host bus adapter. As another example, systems and methods identical and/or analogous to those described above may be used for sideband communication between management controller 112 and a device using PCIe, Ethernet, Fibre Channel, InfiniBand, OmniPath, or any other standard.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a host system comprising:
     a host system processor; and
     a device coupled to the host system processor; and
   a management controller communicatively coupled to the host system processor and configured to:
     provide management of the information handling system; and
     manage multiple functions instantiated on the device via a single sideband interface channel that comprises a Network Controller-Sideband Interface (NC-SI) channel interfaced between the device and the management controller by communicating function-oriented sideband commands, each function-oriented sideband command including a packet header conforming to an NC-SI standard, but in which data is stored in a portion of the header that is designated by the NC-SI standard as reserved, wherein the data includes a function address field for setting forth a function of the multiple functions to which the function-oriented sideband command is addressed, wherein the multiple functions include at least one physical function and at least one virtual function.

2. The information handling system of claim 1, wherein the device comprises a network interface.

3. The information handling system of claim 1, wherein the device comprises a host bus adapter.

4. The information handling system of claim 1, each function-oriented sideband command further including a header revision field indicating that the function-oriented sideband command is a function-oriented command.

5. The information handling system of claim 1, each function-oriented sideband command further including a channel identifier field which uses an addressing scheme for function-oriented sideband commands identical to that of package sideband commands.

6. The information handling system of claim 5, each function-oriented sideband command differentiated from a package sideband command based on at least one of a header revision field, control packet type, and function address field of the function-oriented sideband command.

7. A method comprising, in an information handling system comprising a host system having a host system processor and a device coupled to the host system processor:
   providing management of the information handling system via a management controller; and
   managing multiple functions instantiated on the device by communicating function-oriented sideband commands via a single sideband interface channel that comprises a Network Controller-Sideband Interface (NC-SI) channel interfaced between the device and the management controller, each function-oriented sideband command including a packet header conforming to an NC-SI standard, but in which data is stored in a portion of the header that is designated by the NC-SI standard as reserved, wherein the data includes a function address field for setting forth a function of the multiple functions to which the function-oriented sideband command is addressed, wherein the multiple functions include at least one physical function and at least one virtual function.

8. The method of claim 7, wherein the device comprises a network interface.

9. The method of claim 7, wherein the device comprises a host bus adapter.

10. The method of claim 7, each function-oriented sideband command further including a header revision field indicating that the function-oriented sideband command is a function-oriented command.

11. The method of claim 7, each function-oriented sideband command further including a channel identifier field which uses an addressing scheme for function-oriented sideband commands identical to that of package sideband commands.

12. The method of claim 11, each function-oriented sideband command differentiated from a package sideband command based on at least one of a header revision field, control packet type, and function address field of the function-oriented sideband command.

13. An article of manufacture comprising:
a non-transitory computer-readable medium; and
computer-executable instructions carried on the computer-readable medium, the instructions readable by a processor, the instructions, when read and executed, for causing the processor to, in an information handling system comprising a host system having a host system processor and a device coupled to the host system processor:
provide management of the information handling system via a management controller; and
manage multiple functions instantiated on the device by communicating function-oriented sideband commands via a single sideband interface channel that comprises a Network Controller-Sideband Interface (NC-SI) channel interfaced between the device and the management controller, each function-oriented sideband command including a packet header conforming to an NC-SI standard, but in which data is stored in a portion of the header that is designated by the NC-SI standard as reserved, wherein the data includes a function address field for setting forth a function of the multiple functions to which the function-oriented sideband command is addressed, wherein the multiple functions include at least one physical function and at least one virtual function.

14. The article of claim 13, wherein the device comprises a network interface.

15. The article of claim 13, wherein the device comprises a host bus adapter.

16. The article of claim 13, each function-oriented sideband command further including a header revision field indicating that the function-oriented sideband command is a function-oriented command.

17. The article of claim 13, each function-oriented sideband command further including a channel identifier field which uses an addressing scheme for function-oriented sideband commands identical to that of package sideband commands.

18. The article of claim 17, each function-oriented sideband command differentiated from a package sideband command based on at least one of a header revision field, control packet type, and function address field of the function-oriented sideband command.

* * * * *